US008583962B2

(12) United States Patent
Junghans et al.

(10) Patent No.: US 8,583,962 B2
(45) Date of Patent: Nov. 12, 2013

(54) METHOD, DEVICE, COMPUTER PROGRAM PRODUCT AND DATA PROCESSING PROGRAM FOR HANDLING COMMUNICATION LINK PROBLEMS BETWEEN A FIRST COMMUNICATION MEANS AND A SECOND COMMUNICATION MEANS

(75) Inventors: Sascha Junghans, Boeblingen (DE); Andreas Koenig, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/917,534

(22) Filed: Nov. 2, 2010

(65) Prior Publication Data

US 2011/0113292 A1  May 12, 2011

(30) Foreign Application Priority Data

Nov. 11, 2009  (EP) .................................. 09175676

(51) Int. Cl.
*G06F 11/00* (2006.01)

(52) U.S. Cl.
USPC .................................. 714/34; 714/35; 714/57

(58) Field of Classification Search
USPC .............................. 714/34, 35, 41, 43, 49, 57
See application file for complete search history.

(56) References Cited

U.S. PATENT DOCUMENTS

| | | | | |
|---|---|---|---|---|
| 4,616,335 A * | 10/1986 | Howe et al. | ................... | 713/601 |
| 4,996,688 A * | 2/1991 | Byers et al. | ..................... | 714/45 |
| 6,065,135 A * | 5/2000 | Marshall et al. | ................ | 714/11 |
| 6,389,557 B1 * | 5/2002 | Yu et al. | .......................... | 714/34 |
| 6,550,022 B1 * | 4/2003 | Faver | ............................... | 714/34 |
| 7,168,006 B2 * | 1/2007 | Baker et al. | ..................... | 714/34 |
| 7,509,533 B1 * | 3/2009 | Govindarajalu | ................ | 714/30 |
| 7,577,877 B2 * | 8/2009 | Emerson et al. | ................. | 714/43 |
| 2008/0282005 A1 * | 11/2008 | Chencinski et al. | .......... | 710/105 |
| 2010/0107148 A1 * | 4/2010 | Decker et al. | ................. | 717/168 |
| 2011/0113292 A1 * | 5/2011 | Junghans et al. | ............... | 714/49 |

* cited by examiner

*Primary Examiner* — Joshua Lohn
(74) *Attorney, Agent, or Firm* — Dennis Jung

(57) ABSTRACT

A method for handling communication link problems between a first communication means and a second communication means. Data signals, control signals and/or error information are transferred between the first communication means and the second communication means using the communication link. The method includes activating a static identification pattern in the first communication means representing an error information, and stopping a clock signal (Clk) inside the first communication means to freeze a present error condition, in response to a communication link problem being detected, and transferring the activated static identification pattern permanently and/or repeatedly to the second communication means using the communication link.

13 Claims, 4 Drawing Sheets

METHOD, DEVICE, COMPUTER PROGRAM PRODUCT AND DATA PROCESSING PROGRAM FOR HANDLING COMMUNICATION LINK PROBLEMS BETWEEN A FIRST COMMUNICATION MEANS AND A SECOND COMMUNICATION MEANS

CROSS REFERENCE TO RELATED APPLICATION

This application claims priority under 35 U.S.C. §119 from European Patent Application No. 09175676.7 filed Nov. 11, 2009, the entire contents of which are incorporated herein by reference.

BACKGROUND OF THE INVENTION

1. Field of the Invention

The present invention relates to the field of inter-chip communication.

2. Description of the Related Art

Current computing systems include a set of different chips, e.g., microprocessors, I/O chips, memory chips, and have a system wide control structure for the major configuration, control and recovery functions. Such computer systems are either using dedicated interfaces between the different chips for all communication that is related to these tasks or use special command types that are traveling through the system using the main data path or interfaces.

For coupling of mainframes with high speed interfaces such as InfiniBand, special redundancy features for synchronizing system times are needed. If a communication link between the coupling facility (CF), i.e. a communication means, and a system breaks, there can be several reasons such as a broken or unplugged cable, or a communication means went into a check stop status because of an internal error, and/or an entire system went down and has stopped the communication means.

For coupling software or communication software it is important to distinguish between the different cases. In particular, it is important to identify the case where the system stopped the communication means because the whole system went down.

From the point of view of the communication means, whether the system went down or if the system stopped the chip for any other reason may not be distinguishable. An exemplary implementation might be a mainframe system in which a dedicated error line embedded in the main communication interface from the root complex to the communication means is capable of stopping the communication means due to an internal error or if the whole system went down. If the information that the system error line was active can be communicated to the other end of the link, the system software there can correlate events from different links and draw the right conclusions for recovery of this situation.

With today's methodology, the error information can be transferred over the communication link with manufacturer special flow control packets (SFCP) defined by OpCodes (Operation Codes), which are not used by the standard interface protocol. These vendor specific packets can carry little payload for transferring data from one side to the other.

FIG. 1 shows a device for handling communication link problems between a first communication means 10 and a second communication means 20, in accordance with an embodiment of the prior art. The first communication means 10 includes a first control means 12 connected to a first interface means 14, and the second communication means 20 includes a second control means 22 connected to a second interface means 24. The first communication means 10 and the second communication means 20 are each part of a mainframe system 1, 2, wherein data signals and/or control signals and/or error information are transferred between the first communication means 10 and the second communication means 20 using the communication link 5 build between the first interface means 14 and the second interface means 24. In a memory means 16 the special flow control packets (SFCP) defined by OpCodes (Operation Codes), which are not used by the standard interface protocol, are stored. In normal operation, the connected first control means 12 feeds the first interface means 14 with a continuous sequence of data to be transferred, which in case of. a high speed serial interface as it is used for the InfiniBand or PCI express protocols are so-called ordered sets. These ordered sets are serialized and transferred over the communication link 5. In case of a communication problem the first control means 12 transfers corresponding special flow control packets (SFCP) from the memory means 16 to the first interface means 14 being used to send the corresponding error information to the second communication means 20. In the second communication means 20 the second control means 22 reports the error information to the error structure of the system.

A drawback of this approach is the fact that the chip clock signals Clk coupled to the first control means 12 can not be stopped immediately when the communication problem is occurring but must run some time longer until the special flow control packets (SFCP) are transferred from the first control means 12 to the first interface means 14 and further on over the communication link 5 to the second interface means 22 of the second communication means 20. This delayed clock stop results in debug data of less quality as the debug data is from a much later point in time than the point in time when the communication problem occurred.

SUMMARY OF THE INVENTION

According to an aspect of the invention, a method for handling communication link problems between a first communication means and a second communication means, which are part of at least one mainframe system is presented. The method includes activating a static identification pattern representing an error information in the first communication means, stopping a clock signal (Clk) inside the first communication means to freeze a present error condition in response to a communication link problem being detected, and transferring the activated static identification pattern permanently or repeatedly to the second communication means using the communication link. In addition, at least one of a data signal, a control signal or error information is transferred between the first communication means and the second communication means using the communication link.

In another aspect of the invention, a device for handling communication link problems between a first communication means and a second communication means is presented. The first communication means includes a first control means connected to a first interface means. The second communication means includes a second control means connected to a second interface means. Data signals, control signals or error information are transferred between the first communication means and the second communication means using the communication link.

The device includes a generation means adapted to generate at least one static identification pattern, a switching means arranged between the first control means and the first interface means and responsive to at least one activated error control signal (Err_ctrl_sign) or system error line for switching a connection to the first interface means between the first control means and the generation means. Corresponding to the at least one activated error control signal (Err_ctrl_sign) or system error line, a clock signal (Clk) inside the first communication means is stopped to freeze a present error condition. The connection between the generation means and the interface means is set by the switching means to send an activated static identification pattern permanently or repeatedly to the second communication means using the communication link.

In yet another aspect of the present invention, a data processing program for execution in a data processing system including software code portions for performing a method for handling communication link problems between a first communication means and a second communication when the program is run on the data processing system is presented. The method includes activating a static identification pattern representing an error information in the first communication means, stopping a clock signal (Clk) inside the first communication means to freeze a present error condition in response to a communication link problem being detected, and transferring the activated static identification pattern permanently or repeatedly to the second communication means using the communication link. At least one of a data signal, a control signal or error information is transferred between the first communication means and the second communication means using the communication link.

In still another aspect of the present invention, a computer program product stored on a computer-usable medium, including computer-readable program means for causing a computer to perform a method for handling communication link problems between a first communication means and a second communication means when the program is run on the computer is provided. The method includes activating a static identification pattern representing an error information in the first communication means, stopping a clock signal (Clk) inside the first communication means to freeze a present error condition in response to a communication link problem being detected; and transferring the activated static identification pattern permanently or repeatedly to the second communication means using the communication link. At least one of a data signal, a control signal or error information is transferred between the first communication means and the second communication means using the communication link.

BRIEF DESCRIPTION OF THE DRAWINGS

A preferred embodiment of the invention, as described in detail below, is shown in the drawings, in which.

DETAILED DESCRIPTION OF THE PREFERRED EMBODIMENTS

Figure 1:
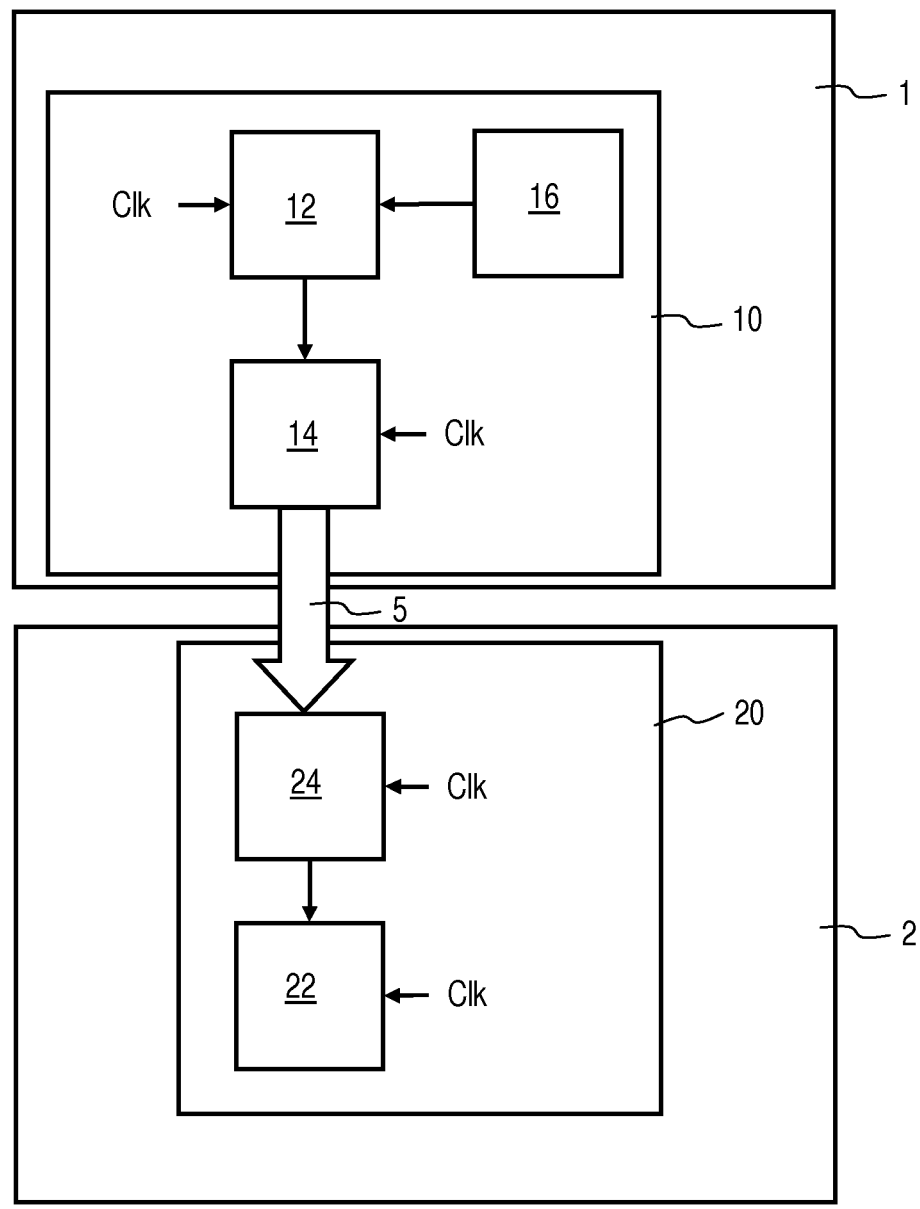
FIG. 1 is a schematic block diagram of a device for handling communication link problems between a first communication means and a second communication means, in accordance with an embodiment of the related art.

The technical problem underlying the invention is to provide a method and a device for handling communication link problems between a first communication means and a second communication means, which are able to detect and to distinguish between problems of a communication link and to perform a clock stop as soon as possible, and to provide a data processing program and a computer program product to perform the method for handling communication link problems between a first communication means and a second communication means.

According to the invention this problem is solved by providing a method for handling communication link problems between a first communication means and a second communication means having the features of claim 1, a device for handling communication link problems between a first communication means and a second communication means having the features of claim 8, a data processing program for performing the method for handling communication link problems between a first communication means and a second communication means having the features of claim 14, and a computer program product causing a computer to perform the method for handling communication link problems between a first communication means and a second communication means having the features of claim 15. Advantageous embodiments of the invention are mentioned in the sub claims.

Accordingly, in an embodiment of the present invention a method for handling communication link problems between a first communication means and a second communication means, especially being part of at least one mainframe system is presented. The data signals and/or control signals and/or error information are transferred between the first communication means and the second communication means using the communication link. The method may include activating a static identification pattern in the first communication means representing an error information, and stopping a clock signal inside the first communication means to freeze a present error condition, in response to a communication link problem being detected, and transferring the activated static identification pattern permanently and/or repeatedly to the second communication means using the communication link.

In further embodiments of the present invention, a given number of static identification patterns are used to represent different communication link problems, wherein each static identification pattern is assigned to one communication link problem.

In further embodiments of the present invention, the static identification pattern is activated in accordance to a corresponding error control signal and/or system error line activated in response to a communication link problem being detected.

In further embodiments of the present invention, different communication link problems are causing different error control signals and/or system error lines being activated.

In further embodiments of the present invention, a communication link problem is detected, when a disconnection of a cable occurs and/or an operation of the first communication means is stopped due to an internal error and/or the operation of the first communication means is stopped due to system break down.

In further embodiments of the present invention, the transferred static identification pattern is detected at the second communication means and a corresponding error condition is reported to a system error structure, wherein a broken communication link is detected at the second communication means due to a fact that no data signals and/or control signals and no static identification pattern are received at the second communication means.

In further embodiments of the present invention, the static identification patterns are symbols not part of an alphabet being used during regular communication over the communication link and/or are symbols of the alphabet being used in a way, that at least one rule of a corresponding communication protocol is hurt.

In another embodiment of the present invention, a device for handling communication link problems between a first communication means and a second communication means, wherein the first communication means includes a first control means connected to a first interface means, and the second communication means includes a second control means connected to a second interface means is shown. Data signals and/or control signals and/or error information are transferred between the first communication means and the second communication means using the communication link. Included are generation means adapted to generate at least one static identification pattern, and a switching means arranged between the first control means and the first interface means and responsive to at least one activated error control signal and/or system error line for switching a connection to the first interface means between the first control means and the generation means. Corresponding to at least one activated error control signal and/or system error line a clock signal inside the first communication means is stopped to freeze a present error condition. The connection between the generation means and the interface means is set by the switching means to send an activated static identification pattern permanently and/or repeatedly to the second communication means using the communication link.

In further embodiments of the present invention, the generation means includes at least one storage means, adapted to store at least one static identification pattern.

In further embodiments of the present invention, inside at least one storage means at least one static identification pattern is implemented as hard-wired logic.

In further embodiments of the present invention, the generation means and/or the switching means are activating at least one static identification pattern in response to at least one error control signal and/or system error line.

In further embodiments of the present invention, the transferred static identification pattern is received at the second communication means by the second interface means and the second control means is reporting a corresponding error condition to a system error structure, wherein the second control means is reporting a broken communication link to the system error structure detected due to a fact that no data signals and/or control signals and no static identification pattern are received at the second communication means.

In further embodiments of the present invention, the switching means include a multiplexer.

In another embodiment of the present invention, a data processing program for execution in a data processing system includes software code portions for performing a method for handling communication link problems between a first communication means and a second communication means when the program is run on the data processing system.

In yet another embodiment of the present invention, a computer program product stored on a computer-usable medium, includes computer-readable program means for causing a computer to perform a method for handling communication link problems between a first communication means and a second communication means when the program is run on the computer.

All in all, embodiments of the invention disclosed herein are able to detect and to distinguish between problems of a communication link and to perform a clock stop immediately after the error control signal and/or the system error line is activated. So embodiments of the invention allow the communication of the error information over the communication link together with an immediate clock stop. This early clock stop results in a very high quality of the debug data, since there is less delay time between the point in time of the clock stop and the point in time were the error causing communication problems occurred.

The above, as well as additional purposes, features, and advantages of the present invention will become apparent in the following detailed written description.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
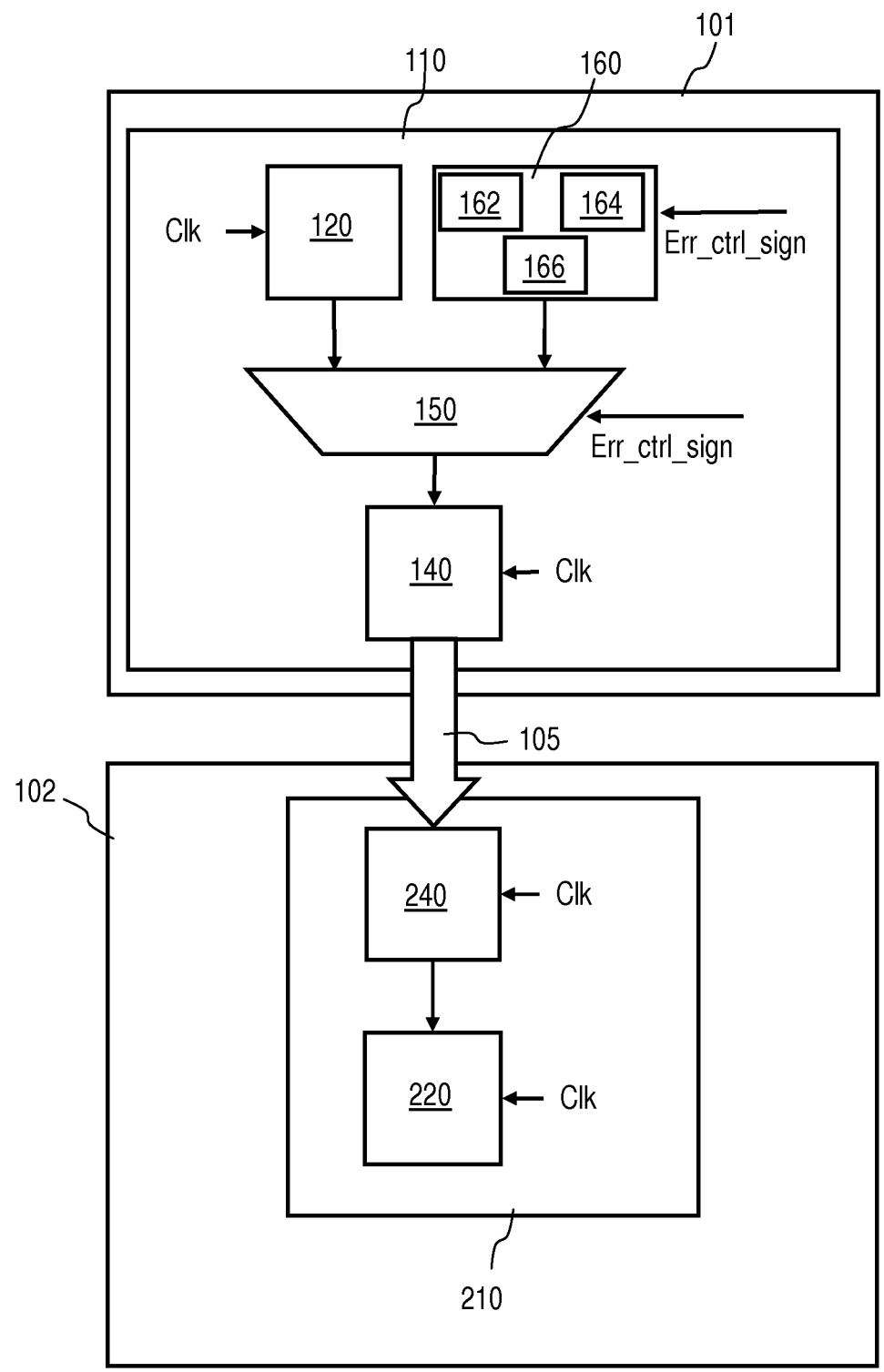
FIG. 2 is a schematic block diagram of a device for handling communication link problems between a first communication means and a second communication means, in accordance with a first embodiment of the present invention.

FIG. 2 shows a device for handling communication link problems between a first communication means 110 and a second communication means 210, in accordance with a first embodiment of the present invention.

Referring to FIG. 2, the shown embodiment of the invention employs a device for handling communication link problems between a first communication means 110 of a first mainframe system 101 and a second communication means 210 of a second mainframe system 102. In the shown embodiment the first communication means 110 acts as sending means and the second communication means 210 acts as receiving means. The first communication means 110 includes a first control means 120 connected to a first interface means 140, and the second communication means 210 includes a second control means 220 connected to a second interface means 240, wherein data signals and/or control signals and/or error information are transferred between the first communication means 110 and the second communication means 210 using the communication link 105.

According to the invention the device for handling communication link problems includes a generation means 160 adapted to generate at least one static identification pattern 162, 164, 166, and a switching means 150 arranged between the first control means 120 and the first interface means 140 and responsive to at least one activated error control signal Err_ctrl_sign and/or system error line for switching a connection to the first interface means 140 between the first control means 120 and the generation means 160. A multiplexer could be used as switching means 150 to pass a dedicated static identification pattern 162, 164, 166 to the first interface means 140 which will then be transferred over the communication link 105 permanently and/or repeatedly for signalling a clock stop because of the active error control signal and/or error line. This special static identification pattern 162, 164, 166 can be detected at the second communication means 210 and a corresponding error information can be reported to a system error structure.

In normal operation, the switching means 150 is connecting the first control means 120 to the first interface means 140 and the connected first control means 120 feeds the first interface means 140 with a continuous sequence of data to be transferred, which in case of e.g. a high speed serial interface as it is used for the InfiniBand or PCI express protocols are so-called ordered sets. These ordered sets are serialized and transferred over the communication link 105.

In response to a communication link problem being detected at least one error control signal Err_ctrl_sign and/or system error line is activated. In response to the activated at least one error control signal Err_ctrl_sign and/or system error line a clock signal Clk inside the first communication means 110 coupled to the first control means 120 is stopped to freeze a present error condition, and the connection between the generation means 160 and the interface means 140 is set by the switching means 150 to send an activated static identification pattern 162, 164, 166 permanently and/or repeatedly to the second communication means 210 using the communication link 105. The clock signals Clk of the first and second interface means 140, 240 driving the wires between the first and second communication means 110, 210 need not to be stopped as no detailed debug information may be pulled out of them. When the clock signals Clk of the first control means 120 are stopped, no data like mentioned sequence of ordered sets will be passed to the first interface means 140 anymore but only one of the static identification patterns 162, 164, 166. Additional in the shown embodiment a storage means adapted to store at least one static identification pattern 162, 164, 166 is used as generation means 160 which is activating the at least one static identification pattern 162, 164, 166 in response to the at least one error control signal Err_ctrl_sign.

Still referring to FIG. 2 three static identification patterns 162, 164, 166 are used to represent different communication link problems, wherein each static identification pattern 162, 164, 166 is assigned to one communication link problem, wherein one of the static identification pattern 162, 164, 166 is activated in accordance to a corresponding error control signal Err_ctrl_sign and/or system error line activated in response to a communication link problem being detected. The different communication link problems are causing different error control signals Err_ctrl_sign and/or system error lines being activated. A communication link problem is detected, for example, when a disconnection of a cable occurs and/or an operation of the first communication means 110 is stopped due to an internal error and/or the operation of the first communication means 110 is stopped due to system break down.

In the shown embodiment a first static identification pattern 162 is activated in accordance to a first error control signal Err_ctrl_sign and/or system error line which is activated if the operation of the first communication means 110 is stopped due to an internal error. A second static identification pattern 164 is activated in accordance to a second error control signal Err_ctrl_sign and/or system error line which is activated if the operation of the first communication means 110 is stopped due to system break down. A third static identification pattern 166 is activated in accordance to a third error control signal Err_ctrl_sign and/or system error line which is activated if disconnection of a cable is detected. As constant identification patterns 162, 164, 166 symbols are selected, which are not part of the regular alphabet so that the second communication means 210 can surely identify this symbols as unique characteristics for the activated error control signal Err_ctrl_sign and/or system error line. Additionally or alternatively symbols of the alphabet may be used as constant identification patterns in a way, that at least one rule of a corresponding communication protocol is hurt. Additionally a broken communication link 105 can be detected by the second control means 220 at the second communication means 210 due to a fact that no data signals and/or control signals and no static identification pattern 162, 164, 166 are received at the second communication means 210. So the second control means 220 is reporting a broken communication link 105 to the system error structure detected due to the fact that no data signals and/or control signals and no static identification pattern 162, 164, 166 are received at the second communication means 210.

For the coupling and/or communication software it is important to distinguish between the different cases, in particular it is important to identify the case where the mainframe system 101 stopped the first communication means 110 while the whole system 101 went down. From the point of view of the first communication means 110, it might not be distinguishable, whether the system went down or if the system 101 stopped the chip 110 for any other reason. An exemplary implementation might be a mainframe system 101 in which a dedicated error line embedded in the main communication interface from the root complex to the first communication means 120 is capable to stop the communication means 120 due to an internal error or the whole system 101 went down. If the information that the system error line was active can be communicated to the other end of the communication link 105 i.e. to the second communication means 210 of the second main frame system 102, the system software there can correlate events from different links and draw the right conclusions for recovery of this situation. For example, in a master-slave-system where the first main frame system 101 is acting as master system and the second main frame system 102 is acting as slave or back up system, it is very important for the second main frame system 102 to know, that the first main frame system 101 went down, so the second main frame system 102 has to act as master system. Since every possible communication problem is activating a corresponding static identification pattern 162, 164, 166 the second control means 220 of the second communication means 210 is also able to detect a broken communication link 105 due to the fact that during a communication process no data signals and/or control signals and no static identification pattern 162, 164, 166 are received at the second communication means 210. So the second main frame system 102 is going on acting as slave or back up system in case of a mechanical break of the communication link 105 since the first main frame system 102 is still working as master. Such a situation can occur, for example, when a communication cable is mechanically disrupted.

Figure 3:
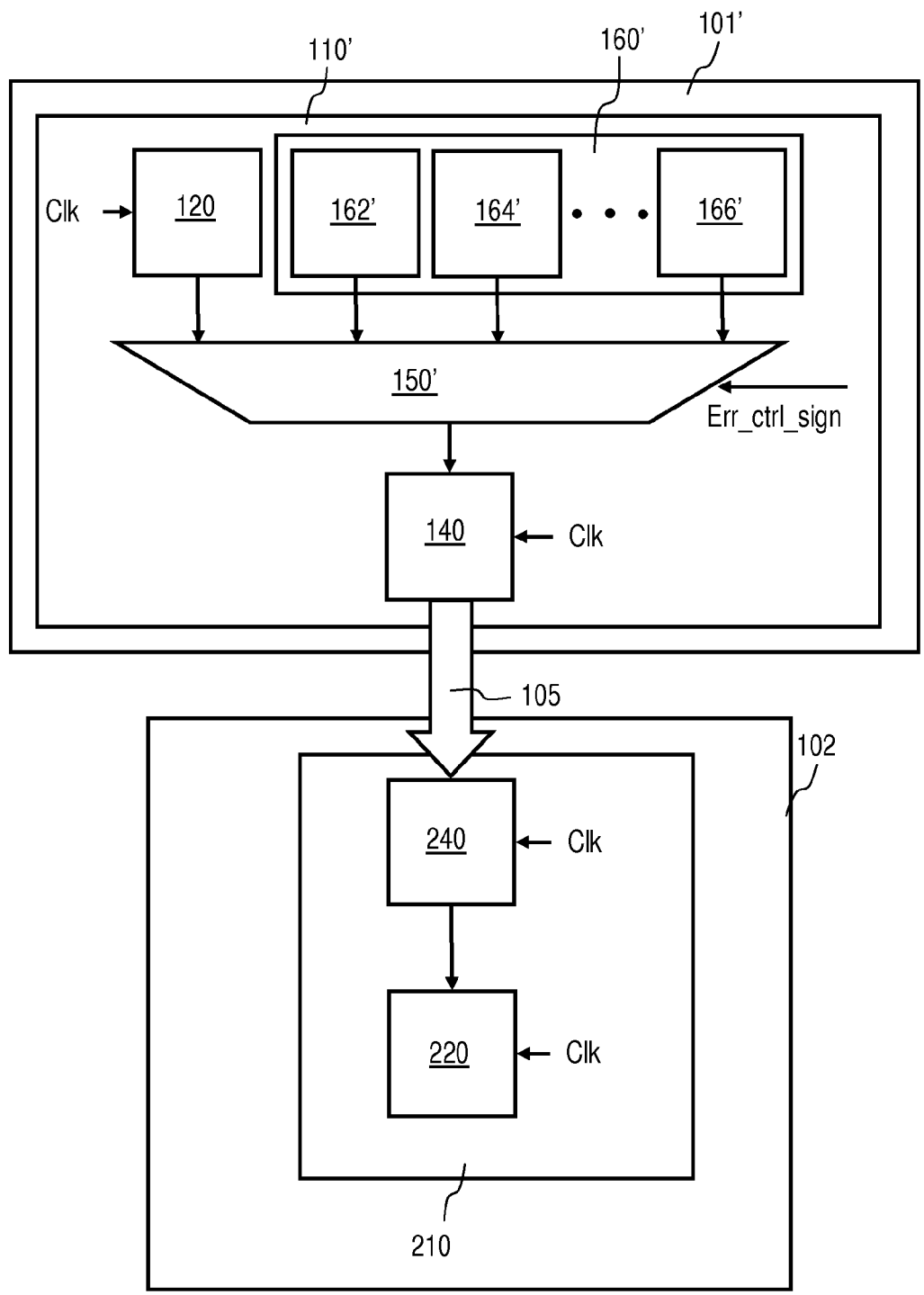
FIG. 3 is a schematic block diagram of a device for handling communication link problems between a first communication means and a second communication means, in accordance with a second embodiment of the present invention.

FIG. 3 shows a device for handling communication link problems between a first communication means 110' and a second communication means 210, in accordance with a second embodiment of the present invention.

Referring to FIG. 3, the shown embodiment of the invention employs a device for handling communication link problems between a first communication means 110' of a first mainframe system 101' and a second communication means 210 of a second mainframe system 102. Like in the embodiment shown in FIG. 2 the first communication means 110' acts also as sending means and the second communication means 210 acts as receiving means. The first communication means 110' includes a first control means 120 connected to a first interface means 140, and the second communication means 210 includes a second control means 220 connected to a second interface means 240, wherein data signals and/or control signals and/or error information are transferred between the first communication means 110 and the second communication means 210 using the communication link 105.

According to the invention the device for handling communication link problems includes a generation means 160' adapted to generate at least one static identification pattern 162', 164', 166', and a switching means 150' arranged between the first control means 120 and the first interface means 140 and responsive to at least one activated error control signal Err_ctrl_sign and/or system error line for switching a connection to the first interface means 140 between the first control means 120 and the generation means 160'. A multiplexer could be used as switching means 150' to pass a dedicated static identification pattern 162', 164', 166' to the first interface means 140 which will then be transferred over the communication link 105 permanently and/or repeatedly for signalling a clock stop because of the active error control signal and/or error line. This special static identification pattern 162', 164', 166' can be detected at the second communication means 210 and a corresponding error information can be reported to a system error structure.

As in the first embodiment of FIG. 2, in the second embodiment of FIG. 3 a storage means adapted to store at least one static identification pattern 162', 164', 166' is used as generation means 160'. But unlike the first embodiment of FIG. 2 in the second embodiment of FIG. 3 at least one static identification pattern 162', 164', 166' is implemented inside the at least one storage means 160' as hard-wired logic, wherein the switching means 150' is activating the at least one static identification pattern 162', 164', 166' in response to the at least one error control signal Err_ctrl_sign and/or system error line.

In normal operation, the switching means 150' is connecting the first control means 120 to the first interface means 140 and the connected first control means 120 feeds the first interface means 140 with a continuous sequence of data to be transferred, which in case of a high speed serial interface as it is used for the InfiniBand or PCI express protocols are so-called ordered sets. These ordered sets are serialized and transferred over the communication link 105.

In response to a communication link problem being detected at least one error control signal Err_ctrl_sign and/or system error line is activated. In response to the activated at least one error control signal Err_ctrl_sign and/or system error line a clock signal Clk inside the first communication means 110' coupled to the first control means 120 is stopped to freeze a present error condition, and the connection between one of the three hard-wired static identification patterns 162', 164', 166' of the generation means 160' and the interface means 140 is set by the switching means 150' to send an activated static identification pattern 162', 164', 166' permanently and/or repeatedly to the second communication means 210 using the communication link 105. The clock signals Clk of the first and second interface means 140, 240 driving the wires between the first and second communication means 110', 210 need not be stopped as no detailed debug information may be pulled out of them. When the clock signals Clk of the first control means 120' are stopped, no data like mentioned sequence of ordered sets will be passed to the first interface means 140 anymore but only one of the static identification patterns 162', 164', 166'.

Like the first embodiment of FIG. 2 three static identification patterns 162', 164', 166' are used in the second embodiment of FIG. 3 to represent different communication link problems. In the shown second embodiment a first static identification pattern 162' is activated in accordance to a first error control signal Err_ctrl_sign and/or system error line which is activated if the operation of the first communication means 110' is stopped due to an internal error, wherein a second static identification pattern 164' is activated in accordance to a second error control signal Err_ctrl_sign and/or system error line which is activated if the operation of the first communication means 110' is stopped due to system break down. A third static identification pattern 166' is activated in accordance to a third error control signal Err_ctrl_sign and/or system error line which is activated if disconnection of a cable is detected. As constant identification patterns 162', 164', 166' also symbols are selected, which are not part of the regular alphabet so that the second communication means 210 can surely identify this symbols as unique characteristics for the activated error control signal Err_ctrl_sign and/or system error line. Like the first embodiment of FIG. 2 additionally or alternatively symbols of the alphabet may be used as constant identification patterns in a way, that at least one rule of a corresponding communication protocol is hurt. Additionally a broken communication link 105 can be detected by the second control means 220 at the second communication means 210 due to a fact, that during a communication process no data signals and/or control signals and no static identification pattern 162', 164', 166' are received at the second communication means 210. So in this case the second control means 220 is reporting a broken communication link 105 to the system error structure detected.

In the shown embodiments of FIGS. 2 and 3 three static identification patterns 162, 164, 166 or 162', 164', 166' are used, but the scope of the invention is not limited to three static identification patterns so any different number less or more than three static identification patterns can be used to report different error information according to the invention.

Figure 4:
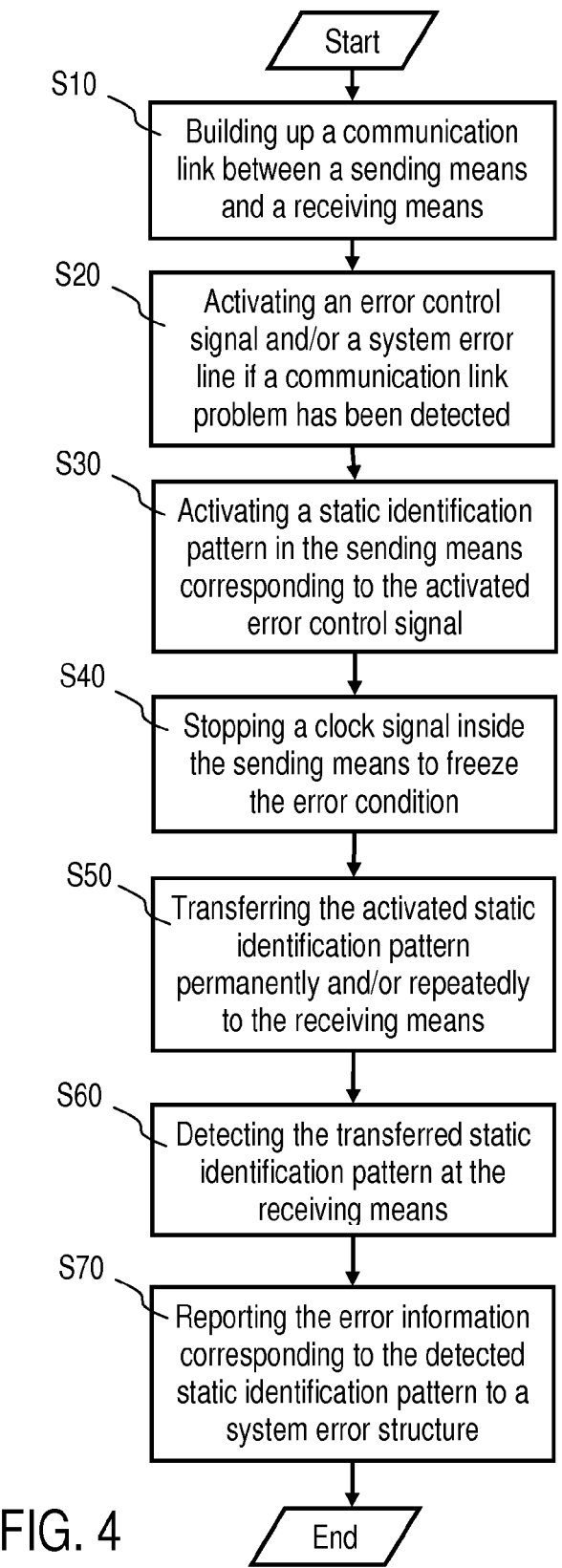
FIG. 4 is a schematic flow chart of a method for handling communication link problems between a first communication means and a second communication means in accordance with an embodiment of the present invention.

FIG. 4 shows a method for handling communication link problems between a first communication means 110, 110' and a second communication means 210 in accordance with an embodiment of the present invention.

Referring to FIG. 4 the flowchart depicts how the devices for handling communication link problems will be used. After an initialization a communication link 105 between a sending means 110, 110' and a receiving means 210 is build up in step S10. In step S20 the error control signal Err_ctrl_sign and/or system error line is activated if a communication link problem has been detected. In step S30 one of the static identification patterns 162, 164, 166 or 162', 164', 166' is activated in the sending means 110, 110' corresponding to the activated error control signal Err_ctrl_sign and/or system error line. In step S40 the clock signal Clk coupled to the first control means 120 inside the sending means 110, 110' is stopped to freeze the present error condition.

Alternatively Step S30 and S40 can be performed simultaneously or the order of Step S30 and S40 can be changed. In step S50 the activated static identification pattern 162, 164, 166, 162', 164', 166' is permanently and/or repeatedly transferred to the receiving means 210. In step S60 the transferred static identification pattern 162, 164, 166, 162', 164', 166' is detected at the receiving means 210. In step S70 the error information corresponding to the detected static identification pattern is reported to a system error structure.

The inventive method for handling communication link problems between a first communication means and a second communication means can be implemented as an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Therefore embodiments of the invention include a device and a method for handling communication link problems between a first communication means and a second communication means which are able to detect and to distinguish between problems of a communication link and to perform a clock stop as soon as possible. This early clock stop results in a very high quality of the debug data, since there is less delay time between the point in time of the clock stop and the point in time were the error causing communication problems occurred.

We claim:

1. A method for handling communication link problems between a first communication means and a second communication means which are part of at least one mainframe system, the method comprising:
   activating a static identification pattern representing an error information in the first communication means;
   stopping a clock signal (Clk) inside the first communication means to freeze a present error condition in response to a communication link problem being detected;
   transferring the activated static identification pattern permanently or repeatedly to the second communication means using a communication link;
   wherein at least one of a data signal, a control signal and error information is transferred between the first communication means and the second communication means using the communication link.

2. The method according to claim 1, wherein a given number of static identification patterns are used to represent different communication link problems, and each static identification pattern is assigned to a communication link problem.

3. The method according to claim 1, wherein the static identification pattern is activated in accordance to at least one of a corresponding error control signal (Err_ctrl_sign) and a system error line activated in response to a communication link problem being detected.

4. The method according to claim 3, wherein different communication link problems are causing at least one of a different error control signal (Err_ctrl_sign) and system error line to be activated.

5. The method according to claim 1, wherein a communication link problem is detected when: a disconnection of a cable occurs, an operation of the first communication means is stopped due to an internal error, or the operation of the first communication means is stopped due to system break down.

6. The method according to claim 1, wherein the transferred static identification pattern is detected at the second communication means and a corresponding error condition is reported to a system error structure, and a broken communication link is detected at the second communication means due to a fact that during a communication process no data signals or control signals and no static identification pattern are received at the second communication means.

7. The method according to claim 1, wherein the static identification patterns are symbols not part of an alphabet being used during regular communication over the communication link or are symbols of the alphabet being used in a way that at least one rule of a corresponding communication protocol is hurt.

8. A device for handling communication link problems between a first communication means and a second communication means, especially for performing the method according to claim 1, wherein the first communication means comprises a first control means connected to a first interface means, and the second communication means comprises a second control means connected to a second interface means, wherein data signals, control signals or error information are transferred between the first communication means and the second communication means using the communication link, the device comprising:
   a generation means adapted to generate at least one static identification pattern;
   a switching means arranged between the first control means and the first interface means and responsive to at least one activated error control signal (Err_ctrl_sign) or system error line for switching a connection to the first interface means between the first control means and the generation means;
   wherein corresponding to the at least one activated error control signal (Err_ctrl_sign) or system error line a clock signal (Clk) inside the first communication means is stopped to freeze a present error condition, and the connection between the generation means and the interface means is set by the switching means to send an activated static identification pattern permanently or repeatedly to the second communication means using the communication link.

9. The device according to claim 8, wherein the generation means comprise at least one storage means adapted to store at least one static identification pattern.

10. The device according to claim 9, wherein inside the at least one storage means the at least one static identification pattern is implemented as hard-wired logic.

11. The device according to claim 8, wherein the generation means or the switching means is activating at least one static identification pattern in response to the at least one error control signal (Err_ctrl_sign) or system error line.

12. The device according to claim 8, wherein the transferred static identification pattern is received at the second communication means by the second interface means and the second control means is reporting a corresponding error information to a system error structure, wherein the second control means is reporting a broken communication link to the system error structure detected due to a fact that during a communication process no data signals or control signals and no static identification pattern are received at the second communication means.

13. The device according to claim 8, wherein the switching means comprise a multiplexer.

* * * * *